United States Patent [19]

Kniel et al.

[11] 3,806,876
[45] Apr. 23, 1974

[54] METHOD OF AND APPARATUS FOR REMOTE CONTROL

[75] Inventors: Roger Kniel, Uster; Jaromir Kucera, Hegnau, both of Switzerland

[73] Assignee: Zellweger AG, Uster, Switzerland

[22] Filed: June 2, 1972

[21] Appl. No.: 259,075

[30] Foreign Application Priority Data
July 1, 1971 Switzerland .................... 8914/71

[52] U.S. Cl. .................... 340/171 R, 340/310 R
[51] Int. Cl. ............................................ H04q 9/00
[58] Field of Search ......... 340/310 A, 310 R, 171 R

[56] References Cited
UNITED STATES PATENTS

| | | | |
|---|---|---|---|
| 2,484,700 | 10/1949 | Fitzsimmons | 340/310 UX |
| 2,685,684 | 8/1954 | Atkinson | 340/310 X |
| 3,223,889 | 12/1965 | Schweitzer | 340/310 X |
| 3,467,835 | 9/1969 | Decola | 340/310 X |
| 3,559,176 | 1/1971 | Baker | 340/310 X |

Primary Examiner—Harold I. Pitts
Attorney, Agent, or Firm—Werner W. Kleeman

[57] ABSTRACT

A method of and apparatus for carrying out remote-control operations, wherein a remote-control frequency is formed from a first auxiliary frequency, the remote-control frequency bearing a predetermined first relationship to the first auxiliary frequency. The first auxiliary frequency and the remote-control frequency are transmitted to a receiver. at the receiver a second auxiliary frequency is formed from the first auxiliary frequency, the second auxiliary frequency bearing a predetermined second relationship to the first auxiliary frequency. The second auxiliary frequency is then delivered as a clock frequency to an N-path filter possessing a filter pass frequency corresponding to the remote-control frequency.

17 Claims, 2 Drawing Figures

METHOD OF AND APPARATUS FOR REMOTE CONTROL

BACKGROUND OF THE INVENTION

The present invention relates to a new and improved method of and an apparatus for remote control.

Remote control techniques are known in the art wherein remote control commands are transmitted by alternating-current impulses or sequences of alternating-current impulses. This is the case for example for remote control operations through the agency of power supply systems, more particularly in ripple control technology. In this case, alternating-current impulses of a remote control frequency $f_S$ are superimposed upon a power supply system with the mains frequency $f_N$.

The advantage of the wide application or coverage of a power supply system and hence the advantage of being able to remote control a large number of apparatus and power consumers connected to the power supply system through the aforementioned signals, are offset by the disadvantage of the high noise level of the power supply system as a channel for transmitting information. The noise level of a power supply system consists mainly of interfering frequencies which are certain harmonics of the mains or network frequency $f_N$. However, transient interfering voltages also frequently occur.

Since in a power supply system the mains frequency $f_N$ is not constant in time, neither are the harmonics of the mains frequency $f_N$ as interfering frequencies. Allowance has to be made for this fact in selecting a suitable remote-control frequency $f_S$. In view of the high noise level of the power supply system used as transmission channel, it is also of advantage to have the bandwidth of the receiver as narrow as is compatible with the nature of the information to be transmitted. In view of this narrow bandwidth, however, it is also necessary to ensure that the pass frequency of the receiver, i.e., its response frequency, is always as nearly as possible consistent with remote control frequency $f_S$ actually transmitted. In view of the fluctuations in the mains frequency $f_N$, it has proved to be of advantage to vary the remote control frequency $f_S$ transmitted through the power supply system to the same extent and in the same sense as the mains frequency $f_N$. This measure ensures that, in the event of fluctuations in the mains frequency, the percentage interval between the remote control frequency $f_S$ and adjacent harmonics of the mains frequency $f_N$ which occur as interfering frequencies remains intact. Methods are already known for correcting the receiver response frequency in regard to the fluctuating remote control frequency $f_S$. In this regard attention is invited, for example, to Swiss Pat. No. 424,968, or British Pat. No. 1,114,983. There the receiver response frequency is formed by a mixing operation with the assistance of a pilot frequency $f_P$ which is in the same fixed ratio to the mains frequency as the remote control frequency $f_S$.

One disadvantage of this method, however, is the dependence of the size of the output signal from the receiver upon the basically variable and unknown phase position between the remote control signal received and the pilot frequency $f_P$ generated at the receiving end or location.

SUMMARY OF THE INVENTION

Thus, an object of the present invention is to provide a method of and apparatus for remote-control operations wherein, on the one hand, the remote-control frequency generated at the transmitting side always bears a predetermined relationship to an auxiliary frequency, preferably a mains frequency, while, on the other hand, the receiver response frequency always bears the same predetermined relationship to the auxiliary frequency, preferably to the mains frequency, as the remote control frequency $f_S$, the output signal from the receiver being unaffected by the phase position at any given moment of the remote control signals received.

The present invention provides a remote control method which is manifested by the features that, at the transmitting side there is formed a remote-control frequency from a first auxiliary frequency delivered to the transmitter, the remote-control frequency bearing a predetermined first relationship to the first auxiliary frequency. The first auxiliary frequency and the remote-control frequency are transmitted through the same transmission channel or through different transmission channels to at least one receiver. At the receiving side there is formed from the first auxiliary frequency a second auxiliary frequency which bears a predetermined second relationship to the first auxiliary frequency. This second auxiliary frequency is itself equal to the remote-control frequency or to a multiple thereof and which, as clock frequency, is fed to at least one N-path filter with the pass frequency $f_S$.

The invention also contemplates the provision of an apparatus for carrying out the above-mentioned method aspects and comprises a transmitter with a first frequency converter which generates from a first auxiliary frequency delivered to it a remote-control frequency bearing a predetermined first relationship to this first auxiliary frequency. A transmission channel or several such transmission channels link the transmitter to at least one receiver and through which the first auxiliary frequency and the remote-control frequency generated therefrom are transmitted either together or separately from one another. The receiver has at least one N-path filter with an associated second frequency converter. The N-path filter passes the remote-control frequency under the effect of a second auxiliary frequency generated by the second frequency converter from the first auxiliary frequency delivered to it and which second auxiliary frequency is delivered as a clock frequency to each N-path filter. The second auxiliary frequency or a repetition frequency of a pulse sequence controlled thereby is equal to the remote-control frequency or to a multiple thereof.

BRIEF DESCRIPTION OF THE DRAWING

The invention will be better understood and objects other than those set forth above will become apparent when consideration is given to the following detailed description thereof. Such description makes reference to the annexed drawing wherein.

DETAILED DESCRIPTION OF THE PREFERRED EMBODIMENTS

Figure 1:
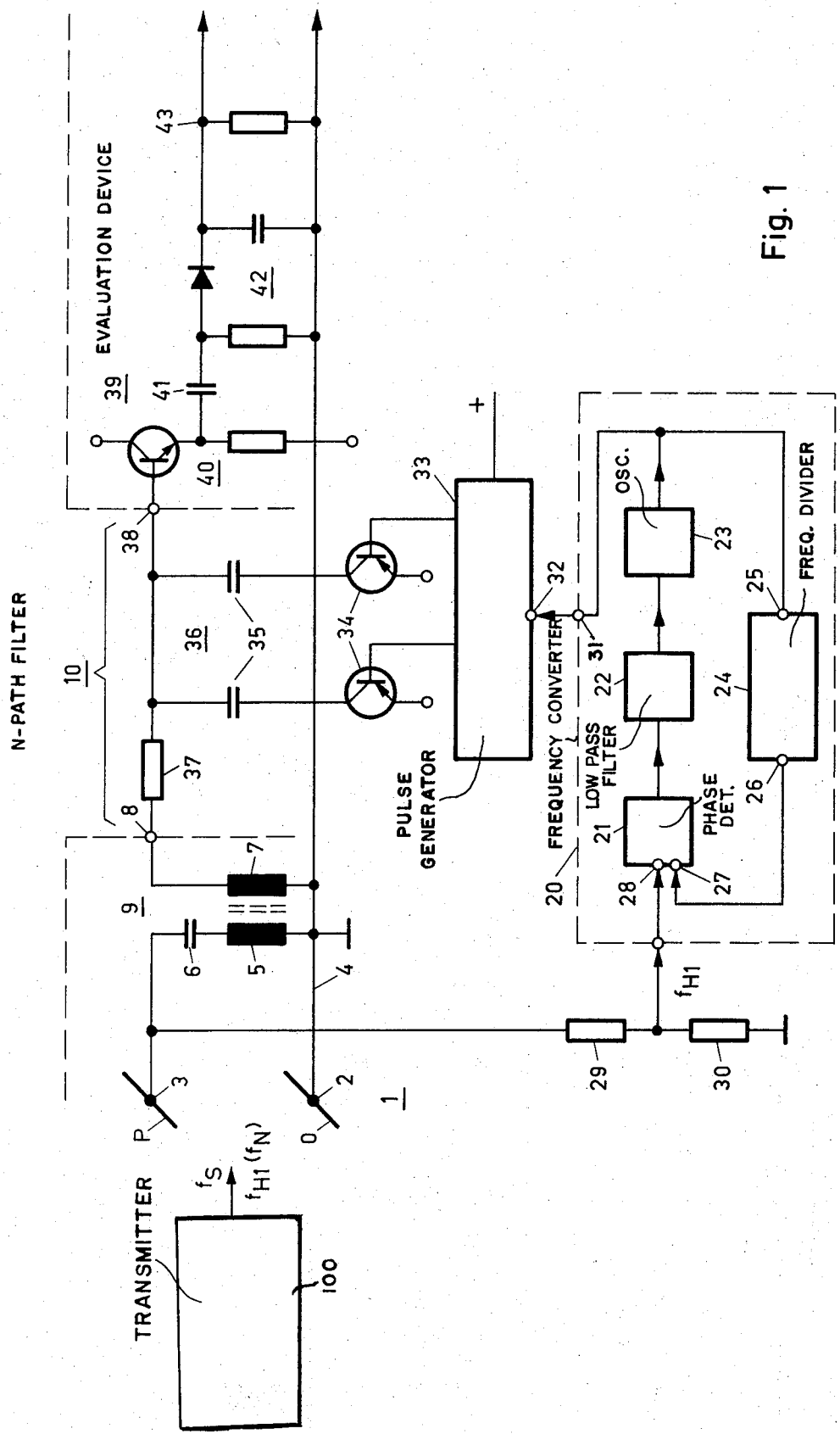
FIG. 1 is a circuit diagram illustrating the input section of a receiver, the remaining parts of the apparatus, both at the transmitting end and also at the receiving end, are assumed to be known in this art and for this reason have not been particularly shown; transmitters suitable for the purpose of the invention are known from ripple control technology and the evaluation of the impulse sequences transmitted by the illustrated receiving section is also known from ripple control technology.

In the apparatus illustrated, a first auxiliary frequency $f_{H1}$ is delivered at the side of a transmitter to a first frequency converter of conventional design, and generally designated in its entirety by reference character 100. The mains frequency $f_N$ of a power supply system for example can be used as the first auxiliary frequency, as assumed for the purposes of the embodiment under discussion. The first frequency converter generates a remote-control frequency $f_S$ which always bears a predetermined first relationship to the first auxiliary frequency $f_{H1}$. Various forms of transmitters suitable for the purposes of this invention have been disclosed in and constitute subject matter of the commonly assigned U.S. application, Ser. No. 259,199 filed June 2, 1972, entitled "Method of and Apparatus for Generating Signals," listing as inventor Jaromir Kucera, one of the co-inventors of this development.

In a first variant, for example, this first predetermined relationship is such that the remote-control frequency $f_S$ is always a certain multiple of the first auxiliary frequency $f_{H1}$. In a second variant, however, this first predetermined relationship can also be such that, for example, the remote-control frequency $f_S$ is always a certain multiple of a fraction of the first auxiliary frequency $f_{H1}$. In a third variant, the first predetermined relationship can also be such that, for example, the remote-control frequency $f_S$ is always equal to the sum of or to the difference between the first auxiliary frequency $f_{H1}$ and another frequency. This other frequency can for example be an integral multiple of the mains frequency.

Further variants are possible. The only crucial factor so far as the present invention is concerned is that there should be a definite relationship for the formation of the remote-control frequency $f_S$ from the first auxiliary frequency $f_{H1}$ in such a way that the law governing the formation of the remote-control frequency $f_S$ can also be applied at the receiver side.

The first or second of the aforementioned variants can be embodied for example in a rotating alternating-current/alternating-current converter which is connected to the power supply system and which comprises a synchronous motor drive. The third of the variants referred to above can be realized for example in accordance with Swiss Pat. No. 447,360, or British Pat. No. 1,145,679.

The remote-control frequency generated by the first frequency converter at the transmitting end is superimposed upon the power supply system, for example, by methods known from ripple control technology. The power supply system acts as the transmission channel. It is of course also possible to use any other type of transmission channel, provided that both the remote-control frequency $f_S$ and also the first auxiliary frequency $f_{H1}$ are transmitted, the latter preferably permanently. However, different transmission channels can also be used for the remote-control frequency $f_S$ and the first auxiliary frequency $f_{H1}$.

In the embodiment under consideration the mains frequency $f_N$ is used as the first auxiliary frequency $f_{H1}$. Accordingly, it is sufficient, as already mentioned, to superimpose the remote-control frequency $f_S$ upon the power supply system in order to make both the first auxiliary frequency, $f_{H1}$, the mains frequency $f_N$ and the remote-control frequency $f_S$ available to a receiver connected to the same power supply system.

FIG. 1 shows a receiving section of a remote-control receiver 1 in its essential details. The remote-control receiver 1 is connected with its terminals 2 and 3 to the neutral conductor O and to a phase conductor P, respectively, of the power supply system. A zero-potential busbar 4 is connected to the terminal 2. Between the input terminals 2 and 3 there is an LC-draining circuit consisting of the series connection of a coil 5 and a capacitor 6. The LC-draining circuit 5, 6 is at least approximately tuned to the remote-control frequency $f_S$. The LC-draining circuit 5, 6 is used to couple the remote-control signals out of the power supply system. In all cases where the remote-control frequency $f_S$ has a non-constant value, but is associated for example through the aforementioned first predetermined relationship to a similarly non-constant first auxiliary frequency $f_{H1}$, the bandwidth of the LC-draining circuit 5, 6 must be adapted to the expected fluctuations in frequency.

A further coil 7 is coupled to the coil 5. One end of coil 7 is connected to the zero-potential busbar 4, while the other end is connected to an output terminal 8. The LC-draining circuit 5, 6 and the coil 7 constitute a preselection part or component 9 of the receiver 1. The preselection part 9 is followed by a main selection part or component 10 which possesses high selectivity or a narrow bandwidth as regards the remote-control frequency $f_S$. In the main selection part 10, this high selectivity is achieved by using an N-path filter. However, since N-path filters such as these pass not only their rated frequency, i.e., in the present case $f_S$, but also the frequency zero and a following narrow frequency range and, in addition, one narrow frequency range on either side of the harmonics $2 \cdot f_S, 3 \cdot f_S ... n \cdot f_S$ of the control frequency $f_S$ (cf. FIG. 2), possible signals in these undesirable frequency ranges have to be suppressed by additional means, for example, by the preselection part 9. In most cases, it is sufficient for the circuit Q of this preselection part 9 to amount to about 5 ..... 15.

Figure 2:
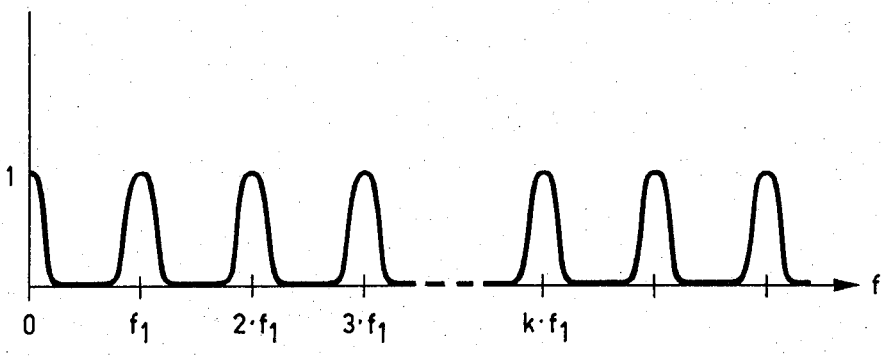
FIG. 2 graphically shows a pass characteristic of an N-path filter.

FIG. 2 illustrates a pass characteristic of an N-path filter. The frequency is plotted along the abscissa and the relative transmission range along the ordinate. The primary purpose of the main selection part 10 is to produce a sufficiently high selectivity for the frequency $f_S$. The level of the output voltage for an N-path filter is unaffected by the momentary phase position of the signal delivered to the N-path filter.

Suitable N-path filters for the purposes of this invention are known in the electronics art, and have been disclosed for example in the text book entitled "Spulenlose Hochfrequenzfilter" Erich Langer, Siemens AG., Berlin/Munich 1969, pages 70 et seq., and the publication entitled "Electronic Design" 22, Oct. 25, 1970, pages 76 – 78.

The invention makes use of the adjustment of the pass frequency, to a predetermined frequency, which is particularly easy to obtain with an N-path filter, and its inherent stability. It is known that the pass frequency can be varied by varying the clock frequency delivered to the N-path filter. In remote-control systems of a certain type one unique feature is that the remote-control frequency does not have a constant value over prolonged periods, but instead changes, as already mentioned, in dependence upon the first auxiliary frequency $f_{H1}$. In this invention, this first auxiliary frequency $f_{H1}$ is also available at the receiving end because the power supply system, taken as the mains frequency $f_N$ in the embodiment under discussion, acts as the transmission channel. Taking into account the law of formation at the transmitting side for the remote-control frequency $f_S$, as reflected in the aforementioned first predetermined relationship, a second auxiliary frequency $f_{H2}$ can be formed in known manner from the first auxiliary frequency $f_{H1}$, i.e., the mains frequency $f_N$ in the present case, in a second frequency converter 20 in the receiver 1. The second auxiliary frequency $f_{H2}$ bears a second predetermined relationship to the first auxiliary frequency $f_{H1}$. This second predetermined relationship is governed on the one hand by the aforementioned first predetermined relationship and on the other hand by the type of N-path filter.

It is known that the clock frequency $f_T$ of an N-path filter should be selected in accordance with the relation $f_T = f_0 \cdot N$, where $f_0$ is the pass frequency and N the number of stages of the N-path filter.

This can be explained in more detail by a numerical example. In the embodiment under discussion it has heretofore been assumed that the first auxiliary frequency $f_{H1}$ is equal to the mains frequency $f_N$, i.e., for example, equal to 50 cycles per second. As the first predetermined relationship A, it will be assumed that the remote-control frequency $f_S$ is always 1 1/2 times $f_N$. Accordingly, the rated value of the remote-control frequency $f_S$ is 275 cycles per second. If it is further assumed that an N-path filter with N = 10 is provided, the clock frequency is $f_T = f_S \cdot N = 275 \cdot 10 = 2,750$ cycles per second. This clock frequency $f_T$ represents a second auxiliary frequency $f_{H2}$ which bears the following relationship to the first auxiliary frequency $f_{H1}$:

$$f_{H2} = f_{H1} \cdot A \cdot N = f_{H1} \cdot B$$

where A represents the first predetermined relationship and B = A. N the second predetermined relationship.

Since N-path filters are also known to pass harmonics of their rated frequency, it would also be possible to select B or N in such a way that the remote-control frequency $f_S$ is equal to one such harmonic. In this case, the remote-control frequency $f_N$ would lie for example in the $k \cdot f_1$ transmission range of the N-path filter.

A known type of frequency converter can be used for forming the clock frequency $f_T$ from the first auxiliary frequency $f_{H1}$ or from the mains frequency $f_N$. For example, it is possible to use a frequency converter functioning on the phase-locked-loop principle, as such has been described for instance in Application Note AN-535 of Motorola Semiconductor Products Inc., of Phoenix, Arizona. As best seen by referring to FIG. 1, a frequency converter of this type comprises a phase detector 21 followed by a low-pass filter 22 and a voltage-controlled variable oscillator 23. The oscillator 23 is a known type of oscillator whose frequency is variable within wide limits by introducing a control voltage. The frequency converter 20 also incorporates a frequency divider 24 which can be constructed for example on the counter principle. An input 25 of this frequency divider 24 is connected to an output of the oscillator 23. In the present case, the frequency divider 24 is adjusted to a dividing ratio of 1/B. A signal with a frequency that is B-times smaller than the frequency of the oscillator 23 than appears at an output 26 of the frequency divider 24. This signal is delivered to an input 27 of the phase detector 21. The first auxiliary frequency $f_{H1}$, in the present case the mains frequency $f_N$, is delivered to another input 28 of the phase detector 21. For this purpose, the input 28 is connected to the junction point of two resistors 29 and 30 which form a voltage divider for the mains voltage between the terminals 3 and 2.

A signal with the frequency $$f_{H2} = B \cdot f_{H1}$$

appears at an output 31 of the frequency converter 30, and this signal is delivered to input 32 of an N-phasic impulse generator 33. N-phasic impulse generators suitable for this purpose are known, and disclosed for example in the above-mentioned literature reference "Spulenlose HF-Filter," Erich Langer, at pages 94 to 97.

The impulse or pulse generator 33 is connected to N-switching transistors 34 which are used for systematically connecting the N-capacitors 35 of an N-path filter 36. The N-capacitors 35 are connected after a resistor 37 of the N-path filter 36. Arrangements of this kind are known, and disclosed for instance in the above-mentioned literature reference "Spulenlose HF-Filter," Erich Langer, at pages 92 et seq.

A signal with the frequency $f_S$ is available at an output 38 of the N-path filter 36. By virtue of the high selectivity of of the main selection part 10, this signal is substantially free from interfering frequencies. By virtue of the fact that the clock frequency of N-path filter 36 always satisfies the condition $f_T = B \cdot f_{H1}$ or $f_T = B \cdot f_N$, the pass frequency of the main selection part 10 automatically follows any fluctuations in the signal frequency $f_S$. In addition, the level of the output voltage in an N-path filter is unaffected by relatively slow changes in the phase position of the input signal at the terminal 8.

An evaluation section 39, known for example from ripple control technology or remote-control art, can be connected to the output terminal 38 of the main selection part 10 and to the zero-potential busbar 4. This evaluation section 39 comprises for example an input amplifier 40 connected through a coupling capacitor 41 to a rectifier stage 42 at whose output terminal 43 there appear in known manner d.c. voltage signals in dependence upon remote-control signals with the frequency $f_S$ delivered to the remote-control receiver 1. These d.c. voltage signals can be delivered in known manner to an evaluation section.

The invention described in the foregoing can be used with advantage for carrying out remote-control operations, but also for related fields such as data transmission, telemetry and the like.

While there is shown and described present preferred embodiments of the invention, it is to be distinctly understood that the invention is not limited thereto but may be otherwise variously embodied and practiced with the scope of the following claims.

What is claimed is:

1. A method of carrying out remote-control operations, comprising the steps of generating a remote-control frequency from a first auxiliary frequency, the remote-control frequency bearing a predetermined first relationship to the first auxiliary frequency, transmitting the first auxiliary frequency and the remote-control frequency to a receiver, generating at the receiver a second auxiliary frequency from the first auxiliary frequency, the second auxiliary frequency bearing a predetermined second relationship to the first auxiliary frequency, supplying the second auxiliary frequency as a clock frequency to an N-path filter possessing a filter pass frequency corresponding to the remote-control frequency, and controlling the filter pass frequency of the N-path filter by means of said clock frequency.

2. The method as defined in claim 1, including the step of generating the second auxiliary frequency so as to be equal to the remote-control frequency.

3. The method as defined in claim 1, including the step of generating the second auxiliary frequency so as to be a multiple of the remote-control frequency.

4. The method as defined in claim 1, including the step of utilizing as the first auxiliary frequency the mains frequency of a power supply system, and superimposing the remote-control frequency formed from the mains frequency upon the power supply system and which is thus delivered to the receiver.

5. The method as defined in claim 1, including the step of controlling by means of the second auxiliary frequency an N-phasic impulse generator to produce a pulse sequence, and supplying the pulse sequence to the N-path filter for controlling the operation thereof.

6. The method as defined in claim 5, including the step of employing the N-phasic impulse generator for controlling more than one N-path filter.

7. The method as defined in claim 1, including the step of utilizing an N-path filter having a rated frequency which is equal to the remote-control frequency.

8. The method as defined in claim 1, including the step of using an N-path filter having a rated frequency which is equal to a fraction of the remote-control frequency.

9. The method as defined in claim 1, including the step of transmitting the first auxiliary frequency and the remote-control frequency through the same transmission channel to a receiver.

10. The method as defined in claim 1, including the step of transmitting the first auxiliary frequency and the remote-control frequency through different transmission channels to the receiver.

11. An apparatus for use in carrying out remote-control operations, comprising transmitter means incorporating a first frequency converter for generating from a first auxiliary frequency delivered thereto a remote-control frequency bearing a predetermined first relationship to the first auxiliary frequency, receiver means operatively associated with the transmitter means for receiving from said transmitter means the first auxiliary frequency and the remote-control frequency generated therefrom, said receiver means including at least one N-path filter and an associated second frequency converter, said second frequency converter forming from the first auxiliary frequency delivered thereto a second auxiliary frequency delivered as a clock frequency to the N-path filter to enable such N-path filter to pass the remote-control frequency, said second frequency converter controlling the filter pass frequency of said N-path filter by means of said clock frequency, said second auxiliary frequency or a repetition frequency of a pulse sequence controlled thereby being equal to the remote-control frequency or a multiple thereof.

12. The apparatus as defined in claim 11, further comprising a pre-selection component and a main selection component associated with said pre-selection component, said main selection component containing the N-path filter, said pre-selection component at least partially suppressing at least some of the frequencies that are not suppressed by the main selection component.

13. The apparatus as defined in claim 11, further including an N-phasic impulse generator following said second frequency converter for generating the clock frequency for the associated N-path filter.

14. The apparatus as defined in claim 13, wherein the clock frequency generated by the N-phasic impulse generator following the second frequency converter is a multiple of the received remote-control frequency.

15. The apparatus as defined in claim 13, wherein the clock frequency generated by the N-phasic impulse generator following the second frequency converter is N-times the remote-control frequency, wherein N is equal to the number of stages in the N-path filter.

16. The apparatus as defined in claim 11, wherein the second auxiliary frequency generated by the second frequency converter is a multiple of the received remote-control frequency.

17. The apparatus as defined in claim 11, wherein the second auxiliary frequency generated by the second frequency converter is N-times the remote-control frequency, and wherein N is equal to the number of stages in the N-path filter.

* * * * *